Figure 1:
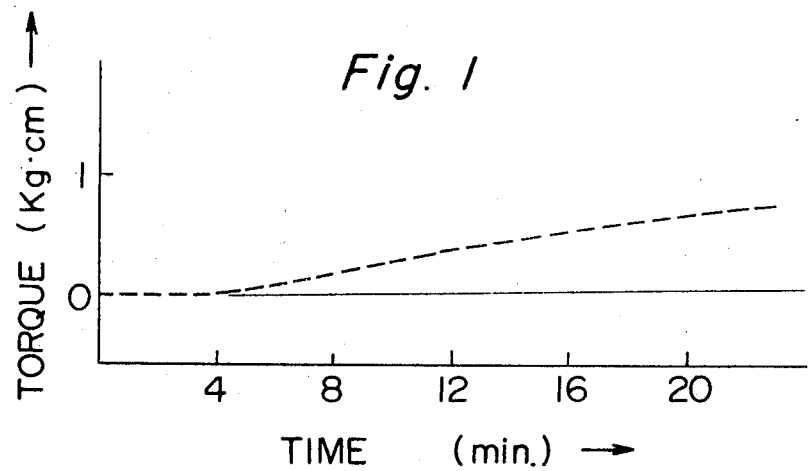

United States Patent [19]

Onizawa

[11] 4,018,749
[45] Apr. 19, 1977

[54] CURABLE COMPOSITION

[75] Inventor: Masao Onizawa, Ohmiya, Japan

[73] Assignee: Sanyo Trading Co., Ltd., Tokyo, Japan

[22] Filed: Jan. 28, 1976

[21] Appl. No.: 653,123

[30] Foreign Application Priority Data

Jan. 29, 1975 Japan .............................. 50-11407
Dec. 11, 1975 Japan ............................ 50-146889

[52] U.S. Cl. .............................. 260/78 A; 526/18; 526/49; 526/296; 526/335
[51] Int. Cl.² ........................................... C08F 8/32
[58] Field of Search ............. 260/78 A; 526/18, 49, 526/296, 335

[56] References Cited

UNITED STATES PATENTS 3,091,603 5/1963 Kuntz .................................. 526/49
3,228,904 1/1966 Morris et al. ..................... 526/49 X
3,491,079 1/1970 Ewards ................................. 526/49
3,544,532 12/1970 Jones et al. ..................... 526/49 X Primary Examiner—William F. Hamrock
Attorney, Agent, or Firm—Wenderoth, Lind & Ponack

[57] ABSTRACT

A curable composition comprising a polybutadiene rubber having bromine bonded to at least one of its ends, and at least one amino acid selected from the group consisting of arginine, lysine, hydroxylysine and ornithine, and a curable composition comprising a polybutadiene having bromine bonded to at least one of its ends, a flowable epoxy resin, and at least one amino acid selected from the group consisting of arginene, lysine, hydroxylysine and ornithine.

3 Claims, 6 Drawing Figures

CURABLE COMPOSITION

This invention relates to a curable composition comprising a polybitadiene rubber having bromine bonded to at least one of its ends (to be referred to in the present application as a brominated polybutadiene rubber) and a specific amino acid, and to a curable composition which further comprises a flowable epoxy resin in addition to the above ingredients.

The brominated polybutadiene rubber arouses interest as a liquid rubber having flowability at room temperature. Triethylene tetramine, tri-dimethylaminophenol, di-4-picolyamine, and hexamethylene tetramine, for example, have previously been known as curing agents for the brominated polybutadiene rubber, but when the brominated polybutadiene rubber is cured using only these known curing agents, heavy mold staining occurs. In order to avoid this trouble, an acid acceptor such as basic lead carbonate must be used together with the curing agent. The acid acceptor, however, remains in the final cured rubber products, and may dissolve out during use to become hazardous to human health. Accordingly, such rubber products cannot be used for medicines or foodstuffs as, for example, a bottle or stopper. Especially, when basic lead carbonate is used, it scatters during the processing of the rubber, and its toxicity adversely affects the health of the working personnel. Accordingly, it has been much desired to develop curing agents which do not require the conjoint use of such acid acceptors.

It has now been found unexpectedly that specific amino acids exhibit superior curing effects for the brominated polybutadiene rubber, and mold staining does not occur even in the absence of an acid acceptor.

According to this invention, there is provided a curable composition comprising a brominated polybutadiene rubber and at least one amino acid selected from the group consisting of arginine, lysine, hydroxylysine and ornithine.

Figure 4:
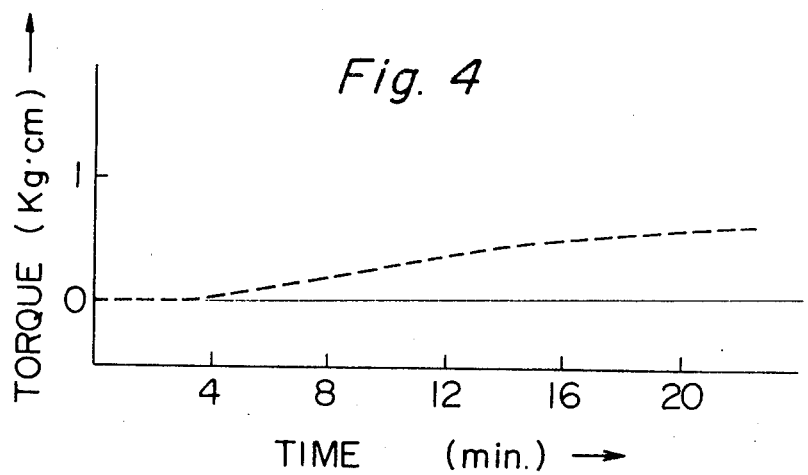
Figure 5:
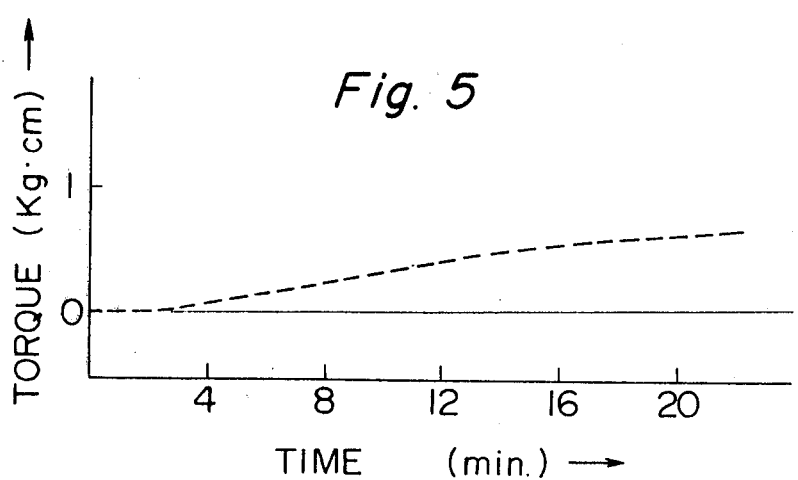
Figure 6:
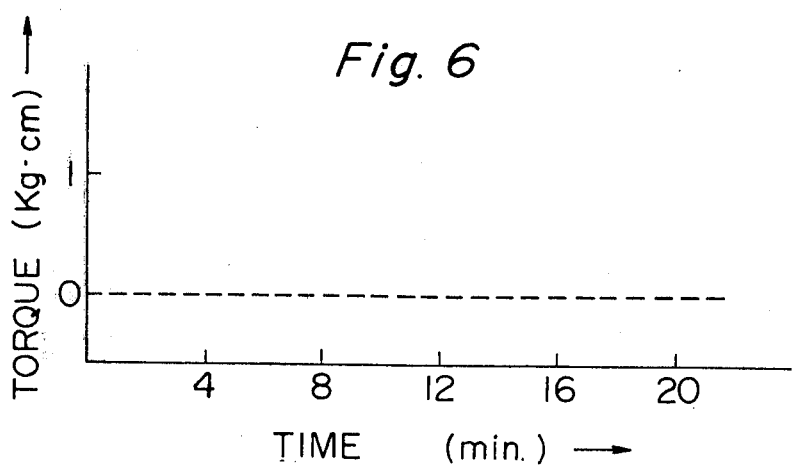

FIGS. 1 to 5 accompanying this application are vulcanization curves showing that the specific amino acids used in this invention have curing effects for the brominated polybutadiene rubber, and FIG. 6 is a flow curve showing that other amino acids than those specified in this invention have no curing effects for the brominated polybutadiene rubber. The solid line drawn in parallel to the axis of abscissas in FIGS. 1 to 5 shows the base line where the torque is 0.

The invention will be described in greater detail below.

The brominated polybutadiene rubber in the composition of this invention is a polybutadiene polymer in which bromine is bonded to its end, preferably both ends, and which is liquid at room temperature and has a molecular weight of usually about 10,000 or less. In some cases, bromine may be bonded to the intermediate portion of the molecule in addition to its ends. Such brominated polybutadiene rubbers are known per se.

It has hitherto been unknown that the amino acids specified in the present invention have superior curing effects for the brominated polybutadiene rubber, and no clear theory has yet been established to account for the mechanism by which the amino acids used in this invention give rise to the curing of the brominated polybutadiene rubber. It is essential however to use the amino acids specified in this invention, and as will be shown in Comparative Example 1 to be given hereinbelow, the brominated polybutadiene rubber cannot be cured with cystine or glutamine which are also amino acids but not within the scope of this invention. In order to cure the composition of this invention, high vulcanization temperatures of usually 130° to 180° C. are required which have previously been employed for brominated polybutadiene rubbers. Furthermore, the curing is carried out usually at a pressure of 180 to 210 Kg/cm$^2$. The suitable amount of the amino acid curing agent to be used is 0.01 to 50 parts by weight, preferably 0.5 to 20 parts by weight, per 100 parts by weight of the brominated polybutadiene rubber.

Various advantages can be obtained by using the specified amino acids as curing agents for the brominated polybutadiene rubber. For example, the use of these amino acids does not cause the mold staining even in the absence of acid acceptors, and no consideration should be given to the dissolving out of toxic acid acceptors from the final rubber products. Furthermore, since there is no need to use a compound of a heavy metal such as lead, no adverse effects are exerted on the health of the working personnel during the processing operation.

If desired, in addition to the brominated polybutadiene rubber and amino acid curing agent, the curable composition of this invention may contain additives usually employed, such as reinforcing agents, processing aids, pigments, softeners or plasticizers. If further required, vulcanization accelerators, acid acceptors, and curing activators can also be incorporated.

The curable composition of this invention can be used in various applications, but is especially suitable for use as adhesives, packings, and sealants.

Previously, I found that the amino acids specified in the present invention are effective curing agents for brominated butyl rubbers and epichlorohydrin rubbers, and filed patent applications on this finding (U.S. patent applications Ser. Nos. 625,874 and 625,106). When the amino acids specified in this invention are used as curing agents for a blend of the brominated polybutadiene rubber used in this invention and the brominated butyl rubber or epichlorohydrin rubber, they show curing effects for all of these component rubbers, and the resulting cured rubber blend has superior performance in various applications.

The use of specific amino acids as a curing agent for the brominated polybutadiene rubber has offered a solution to one of the problems pending in regard to the curing of the brominated polybutadiene rubber, but the brominated polubutadiene rubber technique has another problem yet to be resolved.

As mentioned above, the brominated polybutadiene rubber is a liquid rubber which is flowable at room temperature. Liquid rubbers in general have certain advantages over solid rubbers. For example, the liquid rubbers could be used directly as sealants because of their flowability, whereas the solid rubbers, when desired to be used as sealants, should be rendered flowable by adding a softener. However, the cured brominated polybutadiene rubber generally has low levels of properties such as hardness and strength, and in order to use it as a sealant, a reinforcing agent such as carbon or silica must be added, in most cases, to improve the above properties. In order to improve these properties to the desired degrees, it is generally necessary to mix a farily large amount of such a reinforcing agent with the brominated polybutadidne rubber, and consequently, a uniform mixture is difficult to obtain. Furthermore, the flowability of the mixture is rapidly reduced owing to a rise in viscosity during the mixing operation, and this leads to the substantial loss of the advantages inherent to the liquid rubbers. In order, therefore to maintain the advantages of liquid rubbers in the brominated polybutadiene rubber, it has been greatly desired to develop a curable composition of the brominated polybutadiene rubber which is free from the above-mentioned defects.

This problem can be solved by a three-component curable composition is accordance with a preferred embodiment of this invention, which comprises a brominated polybutadiene rubber, a flowable epoxy resin, and at least one amino acid selected from the group consisting of arginine, lysine, hydroxylysine and ornithine. It has been found that this three-component composition not only can solve the above problem, but also brings about various unexpected advantages.

The brominated polybutadiene rubber and amino acids used in the three-component composition are the same as those described hereinabove. Any known epoxy resins which have flowability (ranging from very low viscosities to jelly-like high viscosities) can be used in this invention. Such epoxy resins having flowability are well known per se. Examples of such epoxy resins include bisphenol A-type epoxy resins, dimeric acid-type epoxy resins, polyalkylene ether-type epoxy resins, novolak-type epoxy resins, cycloaliphatic epoxy resins (peracetate-type epoxy resins), halogenated bisphenol-type epoxy resins, and polyhydric alcohol-type epoxy resins.

The ratio between the brominated polybutadiene rubber and the epoxy resin in the three-component composition can be varied over a wide range, and usually, the amount of the epoxy resin is 1 to 2,500 parts by weight per 100 parts by weight of the brominated polybutadiene rubber. The amount of the amino acid is 0.1 to 60 parts by weight, preferably 0.5 to 30 parts by weight, per 100 parts by weight of the epoxy resin and the brominated polybutadiene rubber combined.

One of the characteristics of the three-component composition is that it can be cured at a low temperature, for example, room temperature. As stated previously, the curing of the two-component composition comprising the brominated polybutadiene rubber and the amino acid requires high temperatures, for example, 130° to 180° C., and even on standing for long periods of time at low temperatures, for example, room temperature, this two-component composition does not at all cure (see Comparative Example 2 given hereinbelow). However, when the three-component composition is allowed to stand at room temperature after its preparation by mixing the constituent components, it is usually maintained liquid for the first one day, but at the end of two days, its flowability is completely lost. After 3 days, the composition is found to be almost completely cured. It is of course possible to promote the curing of the three-component composition by, for example, heating it to a high temperature of, say, 130° to 180° C. It was quite unexpected and unknown that this three-component composition cures at room temperature.

Another feature of the three-component composition of this invention is that the cured product obtained by allowing this composition to stand at room temperature, in most cases, has satisfactory properties (for example, strength, hardness, etc.), and does not require a conventional reinforcing agent such as carbon or silica. Since the epoxy resin is a liquid material, it is easy to form a uniform mixture with the brominated polybutadiene rubber which is also liquid. Furthermore, the amino acid can be mixed with this mixture uniformly by an easy operation. In other words, the three-component composition of this invention is far superior to conventional compositions comprising the brominated polybutadiene rubber and a reinforcing material in that uniform mixtures can be easily obtained. In addition, since the three-component composition of this invention still remains as a liquid having flowability for about one day after its preparation, it has good suitability as a sealant. In this regard, too, the three-component composition of this invention is far superior to the conventional brominated polybutadiene rubber-reinforcing material compositions which rapidly lose their flowability after initiation of mixing. If desired, the properties of the cured product can be further improved by adding a reinforcing agent such as carbon or silica to the three component composition of this invention. In most cases, the amount of the reinforcing agent used to improve the properties further can be reduced to an extent which does not cause the rapid loss of flowability, and therefore, any adverse effects ascribable to the addition of reinforcing agents can be substantially avoided.

In the three-component composition of this invention, the ratio between the amounts of the brominated polybutadiene rubber and the resin can be varied widely as mentioned hereinabove. Cured products obtained from compositions having a relatively low ratio of the epoxy resin to the brominated polybutadiene rubber possess the properties of the brominated polybutadiene rubber as an elastomer, and a modifying effect of the epoxy resin, for example, improved heat resistance. In order to obtain such cured products, it is generally desirable to use 1 to 50 parts by weight, preferably 3 to 20 parts by weight of the epoxy resin, per 100 parts by weight of the brominated polybutadiene rubber.

On the other hand, cured products obtained from compositions having a relatively high ratio of the epoxy resin to the briominated polybutadiene rubber have the properties of a cured epoxy resin, and a modifying effect of the brominated polybutadiene rubber, such as improved impact strength or resistance to crack. When such cured products are to be obtained, it is desirable to add the epoxy resin in an amount of 50 to 2,500 parts by weight, preferably 100 to 1,000 parts by weight, per 100 parts by weight of the brominated polybutadiene rubber. An especially noteworthy feature of the three-component composition of this invention is that it cures at room temperature in the absence of an amine-type curing agent or an acid anhydride-type curing agent which have hitherto been considered as essential for curing epoxy resins. As will be shown in Comparative Example 2 to be given below, a composition comprising the epoxy resin and the amino acid does not cure even upon standing for long periods of time at room temperature. In view of this fact, the above feature of the three-component composition is surprising. In other words, a two-compohent composition prepared by mixing the amino acid specified in the present invention merely with the brominated polybutadiene rubber or the epoxy resin does not cure at room temperature, whereas the three-component composition comprising the amino acid, brominated polybutadiene rubber and epoxy resin cures at room temperature to give a cured product of good quality. This is due probably to a special synergistic action among the three components.

The three-component composition of this invention can be cured simply by allowing it to stand at room temperature and normal atomospheric pressure, but is desired, it may be cured at 130° to 180° C. at an elevated pressure, for example at 180 to 210 Kg/cm².

If desired, the three-component composition of this invention may contain additives such as reinforcing agent, curing agents, crosslinking agents, processing aids, defoamers, pigments or softeners in addition to the brominated polybutadiene rubber, epoxy resin and amino acid.

The three-component composition of this invention can be used in various applications, for example, sealants, adhesives, molded articles, potting agents, rust-proof coating of machinery, surface coating of various cans and drums, baking paints for cans, roofing sheets, water-proof sheets, lining pavements and flooring materials, and packings, etc.

The following Examples and Comparative Examples illustrate the present invention more specifically. Unless otherwise indicated, all parts are by weight. The various properties shown in the examples were measured by the following test methods.

Tensile strength, elongation and modulus

Measured in accordance with JIS K-6301 using a Schopper's tester at a pulling rate of 500 mm/min.

Hardness

Measured in accordance with JIS K-6301 using a JIS A type hardness tester.

Vulcanization curve

Prepared using a JSR-type curelastomer.

EXAMPLE 1

A composition was prepared from the following ingredients, and cured in the following manner.

| | |
|---|---|
| Brominated polybutadiene*[1] | 100 parts |
| SRF carbon black*[2] | 30 |
| CML-21*[3] | 10 |
| 50% aqueous solution of lysine | 10 |

*[1] Polysar XPRD-B-241, a brominated polybutadiene rubber made by Polysar Ltd.
*[2] Semi-reinforcing furnace carbon black used as a reinforcing agent.
*[3] Calcium oxide, a product of Ohmi Chemical Co., Ltd., added as a defoamer.

The above ingredients were weighed, and placed in a mortar. The brominated polybutadiene was mixed with the carbon black, CML-21 and the 50% aqueous solution of lysine. The mixture was ground by a pestle until no particles of the carbon black and CML-21 were observed, to form a uniform mixture. The mixture obtained was cured for 30 minutes by a steam press at 160° C. No mold staining was observed in spite of the fact that no acid acceptor was used. A vulcanization curve of this mixture was obtained using a JSR-type curelastometer at 170° C. The properties of the cured rubber are shown in Table 1, and the vulcanization curve of the mixture is shown in FIG. 1.

Table 1

| | |
|---|---|
| Tensile strength (Kg/cm²) | 9.5 |
| Elongation (%) | 30 |

Table 1-continued

| | |
|---|---|
| Hardness | 62 |

It can be seen from Table 1 and FIG. 1 that the brominated polybutadiene rubber can be cured with lysine.

EXAMPLE 2

| | |
|---|---|
| Brominated polybutadiene rubber*[1] | 100 parts |
| SRF carbon black*[2] | 30 |
| CML-21*[3] | 10 |
| 50% aqueous solution of ornithine | 10 |

*[1], *[2] and *[3] are the same as in Example 1.

The above ingredients were mixed and cured in the same way as in Example 1. No contamination of molds was observed in this curing operation.

Figure 2:
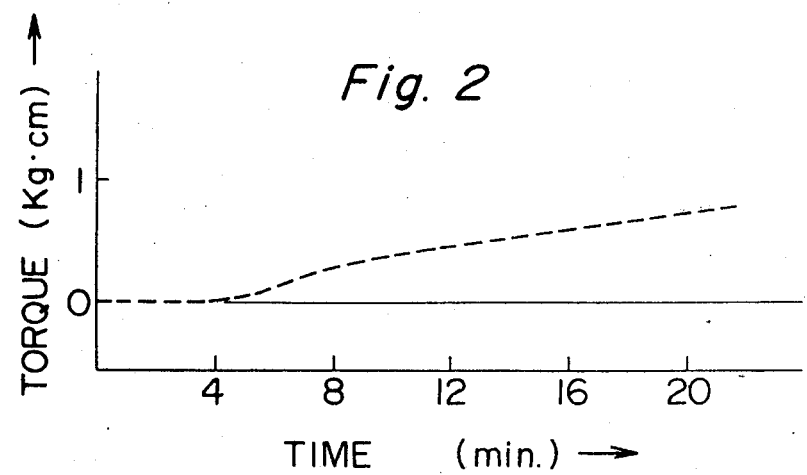

The properties of the resulting cured rubber are shown in Table 2, and the vulcanization curve of the mixture is shown in FIG. 2.

Table 2

| | |
|---|---|
| Tensile strength (Kg/cm²) | 6.5 |
| Elongation (%) | 75 |
| Hardness | 58 |

EXAMPLE 3

| | |
|---|---|
| Brominated polybutadiene rubber*[1] | 100 parts |
| SRF carbon black*[2] | 30 |
| Nulok 321SP*[3] | 30 |
| Arginine paste (water content 40%) | 15 |

*[1], and *[2] are the same as in Example 1.
*[3] A product of Huber Company, U.S.A., obtained by surface treating kaolin clay with aminosilane added as a reinforcing agent.

A mixture composed of the above ingredients was prepared and cured in the same way as in Example 1.

Figure 3:
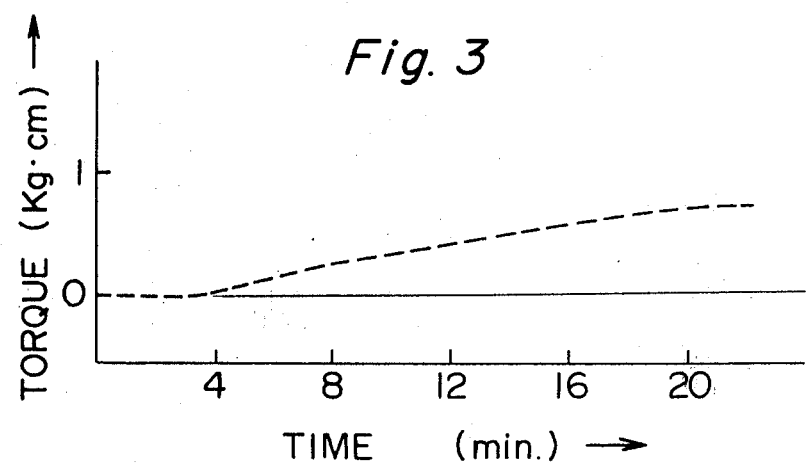

The properties of the cured rubbers obtained by heating for 30 minutes by a steam press at 160° C. are shown in Table 3, and the vulcanization curve of the mixture at 170° C. is shown in FIG. 3. It can be seen from Table 3 and FIG. 3 that the brominated polybutadiene can be cured with arginine. No mold staining was observed in spite of the fact that no acid acceptor was used.

Table 3

| | |
|---|---|
| Tensile strength (Kg/cm²) | 12.0 |
| Elongation (%) | 120 |
| Hardness | 42 |

EXAMPLE 4

| | |
|---|---|
| Brominated polybutadiene rubber*[1] | 100 parts |
| SRF carbon black*[2] | 30 |
| 50% aqueous solution of lysine | 5 |
| Arginine | 5 |

*[1] and *[2] were the same as in Example 1.

The above ingredients were mixed in the same way as in Example 1. The 50% aqueous solution of lysine and the arginine were mixed beforehand, and then mixed with the brominated polybutadiene rubber and the carbon black.

The properties of the cured rubber obtained by heating for 30 minutes by a steam press at 160° C. are shown in Table 4, and the vulcanization curve of the rubber at 170° C. is shown in FIG. 4.

Table 4

| | |
|---|---|
| Tensile strength (Kg/cm²) | 6.2 |
| Elongation (%) | 60 |
| Hardness | 46 |

It can be seen from Table 4 and FIG. 4 that the brominated polybutadiene rubber can be cured with a mixture of lysine and arginine. No mold staining was observed in spite of the fact that no acid acceptor was used in this experiment.

EXAMPLE 5

| | | |
|---|---|---|
| Brominated polybutadiene*(1) | 100 | parts |
| SRF carbon black*(2) | 30 | |
| Nulok 321SP*(3) | 30 | |
| Arginine | 5.8 | |
| 50% Aqueous solution of lysine | 4.2 | |

*(1) and *(2) were the same as in Example 1.
*(3) was the same as in Example 3.

A mixture composed of the above ingredients was prepared and cured in the same way as in Example 4.

The properties of the cured rubber cured for 30 minutes by a steam press at 160° C. are shown in Table 5, and the vulcanization curve of the mixture at 170° C. are shown in FIG. 5.

Table 5

| | |
|---|---|
| Tensile strength (Kg/cm²) | 9.0 |
| Elongation (%) | 80 |
| Hardness | 46 |

COMPARATIVE EXAMPLE 1

This comparison shows that cystine and glutamine which do not belong to the amino acids specified in the present invention do not at all having curing effects for the brominated polybutadiene rubber.

| | Recipe 1 | Recipe 2 |
|---|---|---|
| Brominated polybutadiene rubber *(1) | 100 parts | 100 parts |
| SRF carbon black*(2) | 30 | 30 |
| Nulok 321SP*(3) | 30 | — |
| TE-58A*(4) | 10 | 4 |
| Cystine | 10 | — |
| Glutamine | — | 6 |

*(1) and *(2) were the same as in Example 1.
*(3) was the same as in Example 3.
*(4) An alkali metal salt of a higher fatty acid, added as a dispersibility improver for amino acids, a product of Technical Processing Company, U. S. A.

In Recipe 1, TE-58A and cystine were mixed in advance, and in Recipe 2, TE-58 and glutamine were mixed in advance, after which the mixture was mixed with the brominated polybutadiene. The method of mixing other ingredients was the same as in the preceding Examples. The mixtures obtained in accordance with the Recipes 1 and 2 were each heat-treated at 160° C. for 30 minutes. However, the mixtures remained liquid even after the heat-treatmenent, an no elastomeric rubber was obtained. This evidently shows that no curing occurred. This was also confirmed by the measurement of the flow curve at 170° C. by a JSR curelastometer.

The flow curve is shown in FIG. 6. No rise in torque is observed in the comparison runs according to Recipes 1 and 2.

It can be seen from this flow curve that the brominated polybutadiene rubber cannot be cured at all with cystine or glutamine.

EXAMPLE 6

The following ingredients were uniformly mixed using a mortar, and the resulting compositions were each cured at room temperatures.

| Run No. | 1 | 2 | 3 | 4 |
|---|---|---|---|---|
| Brominated polybutadiene rubber *(1) | 100 parts | 100 parts | 100 parts | 70 parts |
| Epoxy resin *(2) | 5 | 10 | 5 | 30 |
| SRF-L carbon black*(3) | 40 | 40 | 40 | — |
| Nulok 321SP*(4) | — | — | — | 30 |
| CML-21*(5) | 10 | 10 | 10 | 10 |
| 50% aqueous solution of lysine | 10 | — | — | 10 |
| 50% aqueous solution of ornithine | — | 10 | — | — |
| 50% aqueous solution of arginine | — | — | 10 | — |

*(1) Polysar-RTV Liquid Rubber, a registered trademark for a brominated polybutadiene rubber, a product of Polysar Company, with a viscosity of 1,500 poises.
*(2) Epikote 828, a registered trademark for a bisphenol-type epoxy resin, a product of Shell Chemical Co.
*(3) Semi-reinforcing furnace low structure carbon black added as a reinforcing agent.
*(4) was the same as in Example 5.
*(5) was the same as in Example 1.

All of the mixtures obtained remained as a liquid having flowability even after a lapse of one day from the preparation although some rise in viscosity owing to the addition of the reinforcing agent was observed. It was confirmed that 2 days after the preparation, all of the mixtures were clearly found to be cured.

Each of the mixtures was allowed to stand for 7 days at room temperature (20° to 25° C.), and the hardnesses of the cured products were measured using a JIS A-type hardness tester. The results are shown in Table 6.

Table 6

| Run No. | 1 | 2 | 3 | 4 |
|---|---|---|---|---|
| Hardness | 76 | 68 | 34 | 76 |

EXAMPLE 7

Using the following ingredients, the same experiment as in Example 6 was performed.

| Run No. | 1 | 2 |
|---|---|---|
| Brominated polybutadiene rubber *(1) | 100 parts | 80 parts |
| Epoxy resin*(2) | 10 | 20 |
| SRF-L carbon black*(3) | 40 | — |
| Nulok 321SP*(4) | — | 30 |
| CML-21*(5) | — | 10 |
| 50% aqueous solution of | | |

-continued

| Run No. | 1 | 2 |
|---|---|---|
| lysine | 12 | 15 |

*(1), *(3), *(4) and *(5) were the same as in Example 6.
*(2) was Epikote 812, a registered trademark for a polyhydric alcohol-type epoxy resin, a product of Shell Chemical Co.

The state of progress of the curing of each of the mixtures was the same as in Example 6. The hardnesses of the cured products obtained after standing at room temperature (20° to 25° C.) for 1 week are shown in Table 7.

Table 7

| Run No. | 1 | 2 |
|---|---|---|
| Hardness | 46 | 40 |

EXAMPLE 8

The same experiment as in Example 6 was performed using the following ingredients.

| Run No. | 1 | 2 | 3 |
|---|---|---|---|
| Brominated polybutadiene rubber *(1) | 100 parts | 100 parts | 90 parts |
| Epoxy resin *(2) | 5 | 5 | 10 |
| SRF-L carbon black *(3) | 40 | 20 | — |
| Nulok 321SP *(4) | — | — | 30 |
| CML-21 *(5) | 10 | — | 10 |
| 50% aqueous solution of ornithine | 10 | — | — |
| 50% aqueous solution of lysine | — | 8 | 10 |

*(1), *(3), *(4) and *(5) were the same as in Example 6.
*(2) was Epikote 871, a registered trademark for a dimeric acid-type epoxy resin, a product of Shell Chemical Co.

The hardnesses of the cured products obtained by allowing the mixtures to stand at room temperature (20° to 25° C) for one week are shown in Table 8.

Table 8

| Run No. | 1 | 2 | 3 |
|---|---|---|---|
| Hardness | 54 | 44 | 52 |

EXAMPLE 9

The same experiment as in Example 6 was performed using the following ingredients.

| Run No. | 1 | 2 | 3 |
|---|---|---|---|
| Brominated polybutadiene rubber *(1) | 100 parts | 100 parts | 5 parts |
| Epoxy resin *(2) | 5 | 15 | 95 |
| SRF-L carbon black *(3) | 40 | 30 | — |
| Nulok 321SP *(4) | — | — | 30 |
| CML-21 *(4) | 10 | — | 10 |
| 50% aqueous solution of lysine | 10 | — | — |
| 50% aqueous solution of ornithine | — | 15 | 15 |

*(1), *(3), *(4) and *(5) were the same as in Example 6.
*(2) Epikote 872, a registered trademark for a dimeric acid-type epoxy resin obtained by modifying a bisphenol-type epoxy resin with dimeric acid, a product of Shell Chemical Co.

Each of the mixtures obtained was allowed to stand at room temperature for one week, and the hardness of the resulting cured product was measured. The results are shown in Table 9.

Table 9

| Run No. | 1 | 2 | 3 |
|---|---|---|---|
| Hardness | 62 | 38 | 92 |

EXAMPLE 10

A composition shown in Run No. 1 below (the same composition as in Run No. 2 of Example 6) was heated for 30 minutes by a steam press at 160° C. immediately after preparation. For comparison, a two-component composition not containing the epoxy resin was cured under the same conditions.

|  | Run No. 1 | Comparison Run |
|---|---|---|
| Brominated polybutadiene rubber *(1) | 100 parts | 100 parts |
| Epoxy resin *(2) | 10 | — |
| SRF-L carbon black *(3) | 40 | 40 |
| CML-21 *(4) | 10 | 10 |
| 50% aqueous solution of ornithine | 10 | 10 |

*(1), *(2), *(3) and *(4) were the same as in Example 6.

The properties of the resulting cured products are shown in Table 10.

Table 10

| Run No. | Run No. 1 | Comparison Run |
|---|---|---|
| Hardness | 78 | 65 |
| Elongation (%) | 50 | 80 |
| Tensile strength(Kg/cm$^2$) | 31 | 15 |

It is clear from the above results that the hardness of the cured product in Run No. 1 which contained the epoxy resin greatly increased.

COMPARATIVE EXAMPLE 2

Four compositions (the same as compositions in Runs Nos. 1 to 4 in Example 6 except that they did not contain the epoxy resin) were allowed to stand at room temperature (20° to 25° C.). No change was seen even after the lapse of 7 days. In one month, some rise in viscosity was observed, but they still remained as liquid compositions having flowability.

On the other hand, four compositions (the same as the compositions in Runs Nos. 1 to 4 in Example 6 except that the brominated polybutadiene rubber was not added, and the amount of the epoxy resin was changed to 100 parts by weight) were allowed to stand at room temperature (20° to 25° C.). No change was observed even after a lapse of 7 days. In one month, some increase in viscosity was observed, but the composition still remained as liquid compositions having flowability.

What is claimed is:

1. A curable composition comprising a liquid polybutadiene rubber having bromine bonded to at least one of its ends, and at least one amino acid selected from the group consisting of arginine, lysine, hydroxylysine and ornithine.

2. The composition of claim 1 wherein the polybutadiene rubber is a liquid rubber having a molecular weight of not more than about 10,000.

3. The composition of claim 1 wherein the amount of the amino acid is 0.01 to 50 parts by weight per 100 parts by weight of the polybutadiene rubber.

* * * * *